(12) United States Patent
Namiranian (10) Patent No.: US 11,096,021 B2
(45) Date of Patent: Aug. 17, 2021

(54) ESIM PROFILE MANAGEMENT BY MULTIPLE BUSINESS SUPPORT SYSTEMS

(71) Applicant: T-Mobile USA, Inc., Bellevue, WA (US)

(72) Inventor: Babak Namiranian, Bothell, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/918,817

(22) Filed: Jul. 1, 2020

(65) Prior Publication Data

US 2021/0092568 A1 Mar. 25, 2021

Related U.S. Application Data

(60) Provisional application No. 62/905,304, filed on Sep. 24, 2019.

(51) Int. Cl.
| | |
|---|---|
| *H04M 11/00* | (2006.01) |
| *H04N 7/20* | (2006.01) |
| *H04W 4/24* | (2018.01) |
| *H04W 4/50* | (2018.01) |
| *H04W 4/60* | (2018.01) |
| *H04W 8/24* | (2009.01) |
| *H04W 8/28* | (2009.01) |
| *H04W 8/20* | (2009.01) |
| *H04W 8/26* | (2009.01) |

(52) U.S. Cl.
CPC ............... *H04W 4/24* (2013.01); *H04W 4/50* (2018.02); *H04W 4/60* (2018.02); *H04W 8/20* (2013.01); *H04W 8/24* (2013.01); *H04W 8/265* (2013.01); *H04W 8/28* (2013.01)

(58) Field of Classification Search
CPC ........... H04W 4/24; H04W 8/24; H04W 4/60; H04W 8/265; H04W 8/28; H04W 4/50; H04W 8/20
USPC ....................................................... 455/406
See application file for complete search history.

(56) References Cited

U.S. PATENT DOCUMENTS

| | | | | |
|---|---|---|---|---|
| 5,933,785 A | * | 8/1999 | Tayloe | .................... H04W 8/26 455/558 |
| 5,987,325 A | * | 11/1999 | Tayloe | ................. H04B 1/3816 379/357.01 |

(Continued)

*Primary Examiner* — Mark G. Pannell
(74) *Attorney, Agent, or Firm* — Han Santos, PLLC (57) ABSTRACT

Registration information indicating that a wholesale BSS has activated eSIM profiles for corresponding telecommunication devices in corresponding vehicles is received, the registration information including a corresponding key associated with each vehicle. Following a consumer BSS receiving an activation request for activating a new line of telecommunication service for a telecommunication device of a vehicle, in which the activation request includes the key, and the consumer BSS assigning a virtual identifier from a virtual identifier pool to the telecommunication device in response to the activation request, a registration request is received from the consumer BSS that includes a key associated with the vehicle. The key is matched to an eSIM-associated identifier of an eSIM profile. The eSIM-associated identifier is then sent to the wholesale BSS to request that the wholesale BSS enable a new access point name (APN) of the new line of telecommunication service for the telecommunication device.

20 Claims, 4 Drawing Sheets

(56) References Cited

U.S. PATENT DOCUMENTS

| | | | |
|---|---|---|---|
| 2003/0027554 A1* | 2/2003 | Haumont | H04M 15/765 |
| | | | 455/414.1 |
| 2010/0291904 A1* | 11/2010 | Musfeldt | H04L 41/5041 |
| | | | 455/414.1 |
| 2013/0003655 A1* | 1/2013 | Dietz | H04L 65/104 |
| | | | 370/328 |
| 2014/0364087 A1* | 12/2014 | El Mghazli | H04W 8/183 |
| | | | 455/411 |
| 2015/0105048 A1* | 4/2015 | El Mghazli | H04W 4/60 |
| | | | 455/411 |
| 2015/0111529 A1* | 4/2015 | Johnson | H04L 12/1471 |
| | | | 455/406 |
| 2015/0181024 A1* | 6/2015 | El Mghazli | H04M 3/387 |
| | | | 455/411 |
| 2015/0215844 A1* | 7/2015 | Davis | H04W 8/12 |
| | | | 455/432.1 |
| 2015/0271662 A1* | 9/2015 | Lhamon | H04W 8/183 |
| | | | 370/329 |
| 2016/0261596 A1* | 9/2016 | Khello | H04L 63/0892 |
| 2016/0352918 A1* | 12/2016 | Plestid | H04L 12/1453 |
| 2017/0332273 A1* | 11/2017 | Link, II | H04W 8/183 |
| 2020/0220983 A1* | 7/2020 | Hu | H04W 4/24 |
| 2020/0413234 A1* | 12/2020 | Shah | H04L 67/303 |

* cited by examiner

ESIM PROFILE MANAGEMENT BY MULTIPLE BUSINESS SUPPORT SYSTEMS

CROSS-REFERENCE TO RELATED PATENT APPLICATION

This application claims priority to U.S. Provisional Patent Application No. 62/905,304, filed on Sep. 24, 2019, entitled "eSIM Profile Managed by Multiple BSSs" which is hereby incorporated by reference in its entirety.

BACKGROUND

Business support systems (BSSs) are components of wireless carrier networks responsible for managing customer-facing business operations. For example, a BSS of a mobile network operator (MNO) may support user equipment sales, user equipment inventory, and user equipment management, including the management of eSIM profiles that are provisioned to individual wireless telecommunication devices. An embedded subscriber identity module (eSIM) profile that is stored in a wireless telecommunication device may contain a unique international mobile subscriber identity (IMSI) number that authenticates a subscriber to an MNO. Other data that are stored in the eSIM profile may include carrier network information, security authentication information, a list of accessible network services, and/or so forth, that are specific to the MNO. The BSS may also support the billing, charging, and settlement of customer accounts of customers who use the telecommunication services provided by the wireless carrier network of the MNO via their wireless telecommunication devices.

Some MNOs use different business support systems (BSSs) to manage different customer segments. An MNO may have a wholesale BSS that manages wholesale customers, e.g., corporate fleet subscribers, and a consumer BSS that manages retail customers, e.g., individual subscribers. However, current Global System for Mobile Communications Association (GSMA) standards only allow a single eSIM profile to be enabled for use by a single BSS at any time. Further, while some wireless telecommunication devices are equipped with multiple radios and associated software that can support the simultaneous use of multiple eSIM profiles to obtain two different lines of telecommunication services, most wireless telecommunication devices are only equipped with a single radio for cost reasons. Therefore, an MNO that operates multiple BSSs (e.g., wholesale BSS and consumer BSS) is not able to have the multiple BSSs simultaneously manage and bill a customer using a single ISMI of a single eSIM profile on a typical wireless telecommunication device.

This inability may cause problems in some scenarios. For example, an automaker may equip each car it sells with an infotainment device that uses an eSIM profile to obtain telecommunication services from an MNO. The infotainment device may be equipped with only a single radio and a single eSIM profile to reduce cost. The infotainment device may be used by the automaker for vehicle telematics, such as vehicle location tracking, obtaining real-time vehicle performance data, and/or monitoring for vehicle fault. Thus, the wholesale BSS of the MNO is responsible for managing and billing the automaker for such a line of telecommunication service. However, the infotainment device in each car may also allow a consumer who operates the car to subscribe to wireless communication services for other purposes. For example, an individual consumer may want to use the infotainment device of the car to provide a Wi-Fi hotspot, stream music or movies, and/or so forth. This line of telecommunication service would have to be managed and billed by the consumer BSS of the MNO. However, the consumer BSS would be unable to do because of the IMSI of the eSIM profile is already in use by the wholesale BSS.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques that enable multiple business support systems (BSSs) to manage a single eSIM profile for billing multiple lines of telecommunication services using the eSIM profile. In various implementations, a BSS orchestrator may use a key to provide a common linkage between a wholesale BSS and a consumer BSS for billing multiple lines of telecommunication services using the eSIM profile. Further, the consumer BSS may use a virtual identifier from a pool of virtual identifiers for consumer billing while the wholesale BSS uses the real international mobile subscriber identity (IMSI)/integrated circuit card identifier (ICCID) for wholesale billing. The virtual identifier may be a virtual IMSI or a virtual ICCID. For example, an infotainment device in a vehicle may be using a first line of telecommunication service for telematics, in which the first line of telecommunication service is managed by the wholesale BSS via the real IMSI/ICCID. The wholesale BSS may use the real IMSI/ICCID to bill a subscription account of an automaker for the first line of telecommunication service.

However, when a consumer that operates the car wants to add a second line of telecommunication service with the consumer BSS to use an optional service of the infotainment system, the consumer BSS has no real IMSI/ICCID to use because the real IMSI/ICCID is already in use by the wholesale BSS. Accordingly, the addition of the second line of telecommunication service can be accomplished using the virtual identifier (virtual IMSI or virtual ICCID). The use of the virtual identifier enables the consumer BSS to bill a subscription account of the consumer for the second line of telecommunication service. Further, the BSS orchestrator platform may use a key to coordinate the provisioning of the first and second lines of telecommunication services to the infotainment device in the vehicle by the wholesale BSS and the consumer BSS. For example, the key may be a vehicle identification number (VIN) of the vehicle or an embedded universal integrated circuit card identifier (EID) of an embedded universal integrated circuit card (eUICC) that stores the eSIM profile.

In some embodiments, a BSS orchestrator of a wireless carrier network may receive registration information from a wholesale BSS indicating that the wholesale BSS has activated one or more eSIM profiles for one or more corresponding telecommunication devices (e.g., infotainment devices) in one or more corresponding vehicles. The registration information may at least include a corresponding key associated with each vehicle. For example, the key associated with a vehicle may be a VIN of the vehicle or an EID. Subsequently, a consumer BSS may receive an activation request for activating a new line of telecommunication service that includes a key associated with a vehicle. In turn, the consumer BSS may retrieve a virtual identifier from a virtual identifier pool response to the activation request in order to bill a consumer subscription account for a new line of telecommunication service. A registration request is then sent by the consumer BSS to the BSS orchestrator, in which the registration request includes the key associated with the vehicle. The BSS orchestrator may match the key from the registration request to an eSIM-associated identifier of an eSIM profile. The eSIM-associated identifier may be an IMSI stored in the eSIM profile or an ICCID of the eSIM profile. The eSIM-associated identifier is then sent by the BSS orchestrator to the wholesale BSS to request that the wholesale BSS enable a new access point name (APN) of the wireless carrier network for the telecommunication device identified by the eSIM-associated identifier. The new APN may provide the telecommunication device with access to the new line of telecommunication service. The new line of telecommunication service may be a new line that is in addition to another line of telecommunication service already managed by the wholesale BSS.

In such embodiments, it may be possible to subsequently terminate the new line of telecommunication service. The consumer BSS may receive a cancellation request for canceling the new line of telecommunication service for the telecommunication device. In response to the cancellation request, the consumer BSS may deactivate the virtual identifier and send a deregistration request to the BSS orchestrator requesting to disable the new line of telecommunication service. The deregistration request may include the key associated with the vehicle. The BSS orchestrator may match the key from the deregistration request to the eSIM-associated identifier of the eSIM profile. Subsequently, the BSS orchestrator may send the eSIM-associated identifier to the wholesale BSS to disable the new APN for the telecommunication device identified by the eSIM-associated identifier, such that the second line of telecommunication service is disabled.

In other embodiments, a consumer BSS may receive an activation request for activating a new line of telecommunication service for an optional service of a telecommunication device (e.g., an infotainment device) in a vehicle. The activation request may include a key associated with the vehicle, such as the VIN of the vehicle or an EID of an eUICC that stores an eSIM profile for the telecommunication device. In response to the activation request, the consumer BSS may retrieve a virtual identifier from a virtual identifier pool to bill a consumer subscription account for the new line of telecommunication service associated with the optional service of the telecommunication device. Subsequently, the consumer BSS may send a registration request that includes the key to a BSS orchestrator platform to cause the BSS orchestrator platform to send an eSIM-associated identifier that matches the key to a wholesale BSS such that the wholesale BSS enables a new APN for the eSIM-associated identifier. In this way, the new APN may provide the telecommunication device identified by the eSIM-associated identifier with access to the line of telecommunication service. The eSIM-associated identifier may be an IMSI stored in the eSIM profile or an ICCID of the eSIM profile. The line of telecommunication service may be a new line that is in addition to an existing line of telecommunication service already managed by the wholesale BSS.

In such embodiments, it may be possible to subsequently terminate the new line of telecommunication service. The consumer BSS may receive such a cancellation request for canceling the new line of telecommunication service, in which the cancellation request includes the key. In response to the cancellation request, the consumer BSS may deactivate the virtual identifier to terminate the billing of the consumer subscription account for the new line of telecommunication service. Subsequently, the consumer BSS may send a deregistration request that includes the key to the BSS orchestrator platform to cause the BSS orchestrator to send the eSIM-associated identifier that matches the key to the wholesale BSS. In turn, the wholesale BSS may terminate the use of the new line of telecommunication by the telecommunication device by disabling the new APN that is previously enabled for the eSIM-associated identifier.

The embodiments may provide a mobile network operator (MNO) with the ability to use multiple BSSs to manage a single eSIM profile for billing multiple lines of telecommunication services using the eSIM profile. This ability may enable the MNO to use the multiple BSSs to simultaneous billing for the multiple lines of telecommunication services provided to a telecommunication device equipped with a single radio and a single eSIM profile without undergoing a massive BSS migration or a fundamental change in the device management infrastructure of a wireless carrier network. The techniques described herein may be implemented in a number of ways. Example implementations are provided below with reference to the following FIGS. 1-4.

Example Architecture

Figure 1:
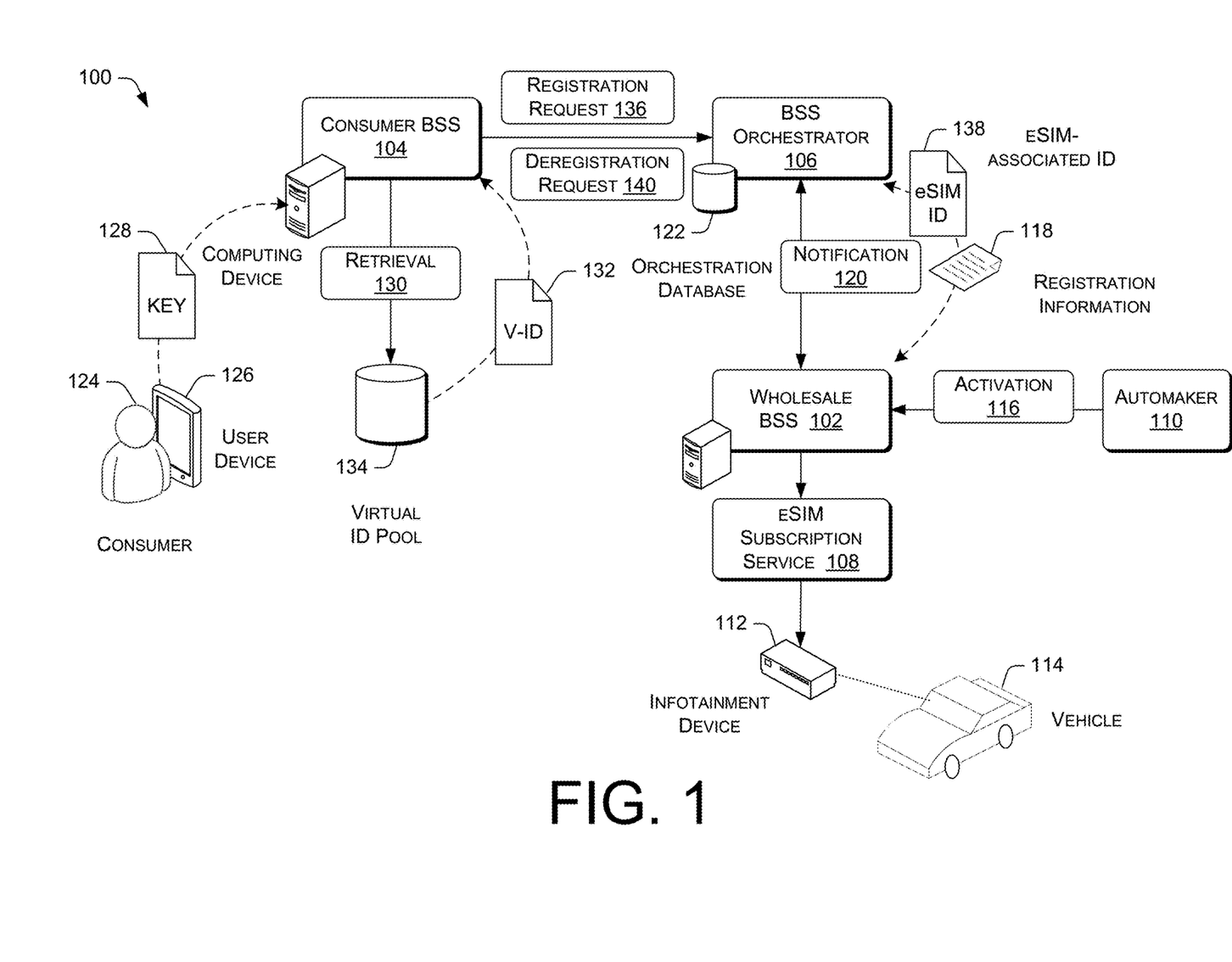
FIG. 1 illustrates an example architecture that enables multiple business support systems (BSSs) to manage a single eSIM profile for billing multiple lines of telecommunication services using the eSIM profile.

FIG. 1 illustrates an example architecture 100 that enables multiple business support systems (BSSs) to manage a single eSIM profile for billing multiple lines of telecommunication services using the eSIM profile. The example architecture 100 may include a wholesale BSS 102, a consumer BSS 104, a BSS orchestrator 106, and an eSIM subscription service 108 that support the operations of an MNO. The MNO may provide a wide range of mobile communication services, as well as ancillary services and features, to subscribers and associated mobile device users. In various embodiments, the wireless communication carrier may provide wireless communication between multiple user devices. Further, the wireless communication carrier may also provide communications between the multiple user devices and user devices that are serviced by other telecommunications networks. The telecommunication services provided may include voice communication, multimedia communication, data communication, such as email, messaging, content streaming, content uploading, and/or so forth.

The MNO may operate a wireless carrier network that is implemented using multiple interconnected networks. In various embodiments, the wireless carrier network may include multiple Radio Access Networks (RANs). The RANs may be connected to each other via regional ground networks. In turn, the regional ground networks may be connected to a core network by a wide area network (WAN). Each regional portion of the wireless communication carrier may include one or more RANs and a regional circuit and/or packet-switched network and associated signaling network facilities. The wireless communication carrier may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth. In some embodiments, the core network of the wireless carrier network may be accessed via wired or wireless local area networks (LANs). For example, a wireless local area network may be a network that is established using Wi-Fi or Bluetooth standards and hardware.

A RAN of the wireless communication carrier may include a number of base stations, also referred as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and a core network of the wireless communication carrier. The core network may connect to a public packet data communication network, such as the Internet. Data and voice communications via the RANs, the core network, and the Internet may support a variety of telecommunication services through the wireless communication carrier.

The wireless carrier network may provide telecommunication services to multiple user devices, which may include consumer devices and M2M devices. Consumer devices are network-capable devices that are generally marketed to individual consumers, and they are capable of obtaining telecommunication and/or data communication services from the wireless communication carrier. For example, these devices may include a smartphone, a tablet computer, a smartwatch, a gaming console. M2M devices are networked machines that use the telecommunication services provided by the wireless carrier to communicate with other devices. For example, M2M devices may include infotainment devices that are installed in vehicles. Each of the infotainment devices may be equipped with eUICC, i.e., an integrated circuit chip that is directly wired or soldered to a circuit board of the infotainment device. The eUICC may store an eSIM profile that includes information for accessing telecommunication services provided by the MNO. Each infotainment device may be further equipped with a modem and a radio that enable the infotainment device to perform telecommunication and data communication with the wireless carrier network. An infotainment device in a vehicle may be used for dual purposes, such as providing telematics data to an automaker regarding vehicle status and operations, as well as provide infotainment to a consumer that operates the vehicle.

The BSSs of the MNO may support user equipment sales, user equipment inventory, and user equipment management, including the management of eSIM profiles that are provisioned to individual wireless telecommunication devices. The BSSs may also support the billing, charging, and settlement of customer accounts of customers who use the telecommunication services provided by the wireless carrier network of the MNO via their wireless telecommunication devices. The BSSs of the MNO may provide such support for different market segments. The wholesale BSS 102 may provide such support for wholesale customers that order a large number of telecommunication service lines for a large number of user devices. For example, the wholesale BSS 102 may provide such support to an automaker 110 that wants to order a large number of telecommunication service lines for infotainment devices in a fleet of vehicles. In contrast, the consumer BSS 104 may provide such support to individual consumers who want lines of telecommunication service for individual devices. As further explained below, the BSS orchestrator 106 may be a service of the MNO that coordinates the activities of multiple BSSs, both wholesale and consumer, such that the multiple BSSs may manage a single eSIM profile of a telecommunication device for billing multiple lines of telecommunication services using the eSIM profile.

The eSIM subscription service 108 may be responsible for the management of eSIM profiles on behalf of a BSS, such as the wholesale BSS 102. The eSIM subscription service 108 may include at least one Subscription Manager Data Preparation (SM-DP), at least one Subscription Manager Data Preparation Plus (SM-DP+), and at least one Subscription Manager Secure Routing (SM-SR). For example, the eSIM subscription service 108 may be responsible or distribute, activating, or deactivating an eSIM profile for an infotainment device 112 of a vehicle 114.

In operation, the automaker 110 may initially contact the MNO to request that the MNO perform activation 116 for infotainment devices in a fleet of vehicles prior to the distribution of the vehicles to consumers. The request may include the automaker 110 providing the VINs of vehicles to the MNO. During activation 116, the MNO may use the wholesale BSS 102 and the eSIM subscription service 108 to equip the infotainment devices of the vehicle with eSIM profiles. For example, the eSIM subscription service 108 may download a corresponding eSIM profile into an eUICC of each infotainment device. The activation of each eSIM profile for each infotainment device by the wholesale BSS 102 may involve enabling a wholesale APN (e.g., a business-to-business (B2B) APN) for an eSIM-associated identifier (e.g., an IMSI or an ICCID) of each eSIM profile. Thus, when an infotainment device with an eSIM-associated identifier attaches and registers with the wireless carrier network, the infotainment device may use the wholesale APN to access a line of telecommunication service. In this way, each infotainment device may access a corresponding line of telecommunication service using the wholesale APN, and the wholesale BSS 102 may use the eSIM-associated identifiers of the eSIM profiles to bill a wholesale subscription account of the automaker 110 for the lines of telecommunication services at a wholesale rate. For example, the automaker 110 may use the lines of telecommunication services for obtaining telematics of the vehicles. As a part of the activation 116, the wholesale BSS 102 may generate registration information 118 that tracks the relationships between the VINs of the vehicles, the eUICC Identifier (EID) Of the corresponding eUICCs that physically store the eSIM profiles, the IMSIs stored in the corresponding eSIM profiles, and the ICCID of the corresponding eSIM profiles. In some instances, the registration information for a fleet of vehicle may have the following example table structure with multiple data entries (numbers in the table are used for illustrative purpose only):

| VIN | EID | IMSI | ICCID |
|-----|-----|------|-------|
| 10  | 11  | 12   | 13    |
| 20  | 21  | 22   | 23    |
| 30  | 31  | 32   | 33    |
| 40  | 41  | 42   | 43    |
| 50  | 51  | 52   | 53    |
| —   | —   | —    | —     |

Subsequently, the wholesale BSS 102 may perform notification 120 to notify the BSS orchestrator 106 of the activation 116. During notification 120, the wholesale BSS 102 may send the registration information 118 to the BSS orchestrator 106. In turn, the BSS orchestrator 106 may store the registration information 118 in an orchestration database 122. The BSS orchestrator 106 may further designate the VIN or EID in each data entry of the registration information 118 as the key of each corresponding vehicle.

Once the fleet of vehicles is distributed to consumers, a consumer 124 may contact the consumer BSS 104 to activate a new line of telecommunication service. For example, the consumer 124 may want to activate the new line of telecommunication service in order to use an optional service with the infotainment device 112 that is onboard the vehicle 114. In such an example, the optional service may be used to enable a feature of the infotainment device 112 so that the device can be used as a Wi-Fi hotspot, for streaming music or movies, and/or so forth. In some embodiments, the consumer 124 may use a user device 126 to send an activation request for activating a new line of telecommunication service that includes a key 128 (e.g., a VIN or an EID) to the consumer BSS 104. In alternative embodiments, the consumer 124 may call or text a customer service representative of the MNO with a request to use the optional service and provide the key 128. In turn, the customer service representative may input an activation request for the new line telecommunication service that includes the key 128 into a service interface portal of the consumer BSS 104.

In turn, the consumer BSS 104 may perform a retrieval 130 of an available virtual identifier 132 from the virtual identifier pool 134. The virtual identifier 132 may be a virtual IMSI or a virtual ICCID. The virtual identifier 132 is then used by the consumer BSS 104 to activate the new line of telecommunication service for a subscription account of the consumer 124. In some instances, the consumer BSS 104 may then notify a database logic of the virtual identifier pool 134 to change an identifier status of the virtual identifier 132 to in use, so that the virtual identifier 132 is no longer available for use by other consumer BSSs. In various instances, the new line of telecommunication service may be an additional line that is added to a newly established subscription account of the consumer 124. In other instances, the new line of telecommunication service may be an additional line that is added to an existing subscription account of the consumer 124. In the latter instances, the activation request may further include a user identifier of the consumer 124 that is associated with the existing subscription account of the consumer 124. The consumer BSS 104 may further associate the key 128 with the virtual identifier 132 used for the new line of telecommunication service.

Subsequently, the consumer BSS 104 may send a registration request 136 to the BSS orchestrator 106 to notify the BSS orchestrator 106 that the subscription account of the consumer 124 has been updated to include the new line of telecommunication service. In various embodiments, the registration request 136 may include the key 128 and an APN, e.g., a consumer APN, associated with the new line of telecommunication service. The consumer APN may also be referred to as a business-to-consumer (B2C) APN. In some instances, the registration request may further include the virtual identifier 132 and/or other information.

The registration request is then processed by the BSS orchestrator 106. In various embodiments, the BSS orchestrator 106 may use the orchestration database 122 to lookup an eSIM-associated identifier 138 that corresponds to the key 128. Subsequently, the BSS orchestrator 106 may send the eSIM-associated identifier 138 to the wholesale BSS 102 to request that the wholesale BSS 102 enable the APN of a new line of telecommunication service for the infotainment device 112. In turn, the wholesale BSS 102 may enable the APN for the eSIM-associated identifier 138. Accordingly, when the infotainment device 112 with the eSIM-associated identifier 138 attaches and registers with the wireless carrier network, the infotainment device 112 may use the APN to access the new line of telecommunication service. Further, the consumer BSS 104 is able to bill a subscription account of the consumer 124 for the new line telecommunication service. At the same time, the wholesale BSS 102 is able to bill a wholesale subscription account of the automaker 110 for the initial corresponding line of telecommunication service used by the infotainment device 112.

In the event that the consumer 124 decides to cancel the option service of the infotainment device 112, the consumer 124 may use a user device 126 to send a cancellation request for canceling the new line of telecommunication service that includes the key 128 to the consumer BSS 104. Alternatively, the consumer 124 may call or text a customer service representative of the MNO with a request to cancel the optional service and provide the key 128. In turn, the customer service representative may input a cancellation request for canceling the new line telecommunication service that includes the key 128 into a service interface portal of the consumer BSS 104.

In turn, the consumer BSS 104 may deactivate the use of the virtual identifier 132, in which deactivation of the virtual identifier 132 terminates the billing of the consumer subscription account of the 124 for the new line of telecommunication service. In some instances, the consumer BSS 104 may further notify the database logic of the virtual identifier pool 134 to change the identifier status of the virtual identifier 132 to available, so that the virtual identifier 132 is available for use by other consumer BSSs.

Subsequently, the consumer BSS 104 may send a deregistration request 140 to the BSS orchestrator 106 to request a disablement of the new line of telecommunication service. The deregistration request 140 may include the key 128. In some instances, the deregistration request may further include the APN of the new line of telecommunication service, the virtual identifier 132, and/or other information.

The deregistration request is then processed by the BSS orchestrator 106. In various embodiments, the BSS orchestrator 106 may use the orchestrator database 122 to look up the eSIM-associated identifier 138 that corresponds to the key 128. Subsequently, the BSS orchestrator 106 may send the eSIM-associated identifier 138 to the wholesale BSS 102 to request that the wholesale BSS 102 disable the APN of the new line of telecommunication service for the infotainment device 112. In turn, the wholesale BSS 102 may disable the APN for the eSIM-associated identifier 138 by disassociating the APN with the eSIM-associated identifier 138, so that the new line of telecommunication is disabled for the infotainment device 112. However, the initial corresponding line of telecommunication service for the infotainment device 112 remains active, and the wholesale BSS 102 is able to continue to bill the wholesale subscription account of the automaker 110 for the initial corresponding line of telecommunication service.

Example Network Components

Figure 2:
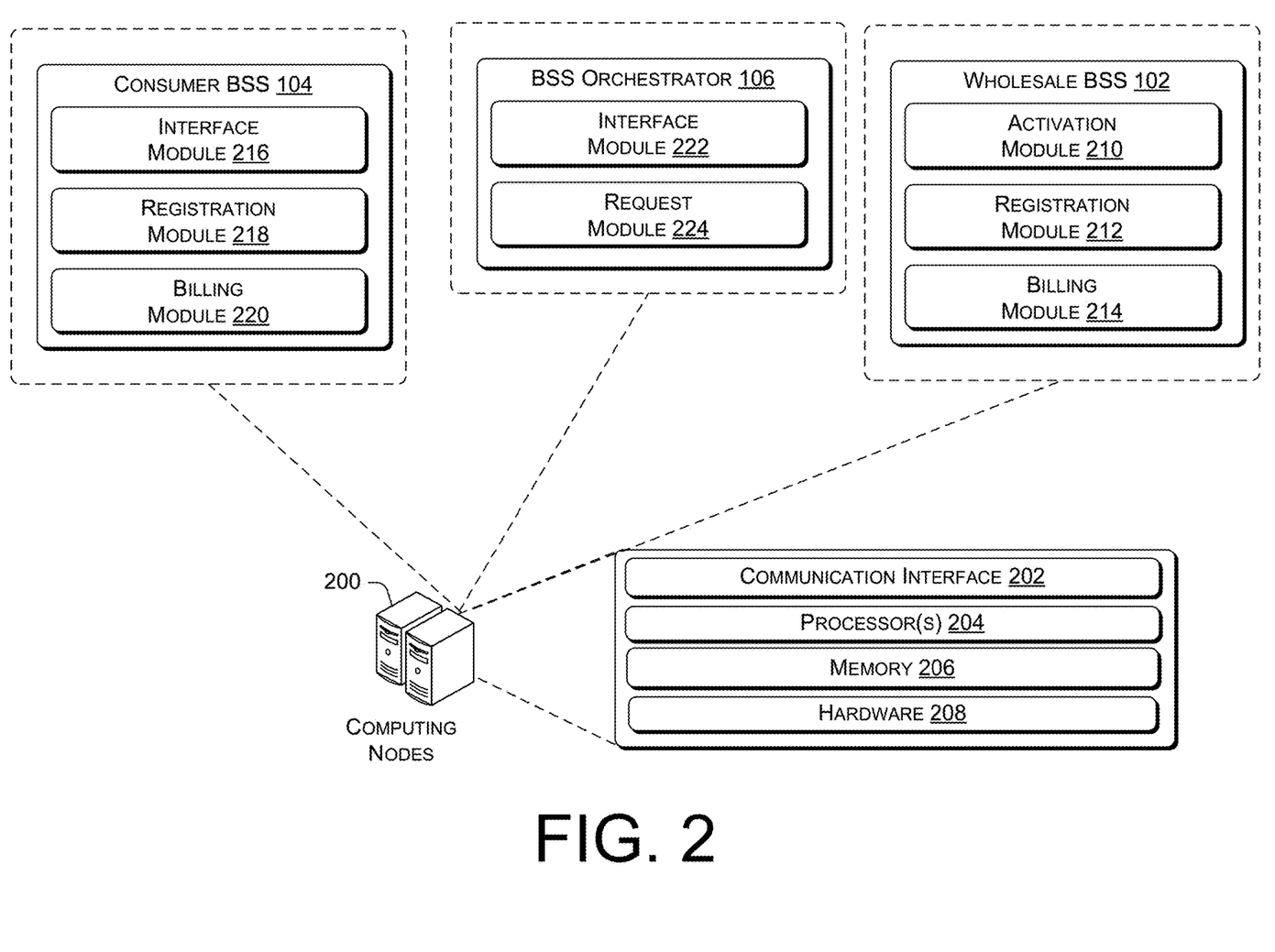
FIG. 2 is a block diagram showing various components of a consumer BSS, a wholesale BSS, and a BSS orchestrator platform that enables multiple BSSs to manage a single eSIM profile for billing multiple lines of telecommunication services using the eSIM profile.

FIG. 2 is a block diagram showing various components of a consumer BSS, a wholesale BSS, and a BSS orchestrator platform that enables multiple BSSs to manage a single eSIM profile for billing multiple lines of telecommunication services using the eSIM profile. The computing nodes 200 may include a communication interface 202, one or more processors 204, memory 206, and hardware 208. The communication interface 202 may include wireless and/or wired communication components that enable the computing nodes 200 to transmit data to and receive data from other networked devices. The hardware 208 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In other embodiments, the computing nodes 200 or components thereof may be virtual computing devices in the form of virtual machines or software containers that are hosted in a computing cloud.

The computing nodes 200 may implement components of the wireless communication carrier, such as the wholesale BSS 102, the consumer BSS 104, and the BSS orchestrator 106. Each component may include modules that are made up of routines, code segments, program instructions, objects, and/or data structures that perform particular tasks or implement particular abstract data types. In some embodiments, one or more of wholesale BSS 102, the consumer BSS 104, and the BSS orchestrator 106 may be executed by a different set of computing nodes that are operated by different entities for the benefit of the wireless carrier network.

The wholesale BSS 102 may include an activation module 210, a registration module 212, and a billing module 214. The activation module 210 may work in conjunction with the eSIM subscription service 108 to perform activation 116 for infotainment devices in a fleet of vehicles prior to the distribution of the vehicles to consumers in response to a request from the automaker 110. The activation of each eSIM profile for each infotainment device by the activation module 210 may involve enabling a wholesale APN for an eSIM-associated identifier (e.g., an IMSI or an ICCID) of each eSIM profile. In this way, each infotainment device may access a corresponding line of telecommunication service using the wholesale APN, and the wholesale BSS 102 may use the eSIM-associated identifiers of the eSIM profiles to bill a wholesale subscription account of the automaker 110 for the lines of telecommunication services at a wholesale rate. As a part of the activation 116, the activation module 210 may generate registration information 118. Subsequently, the activation module 210 may perform notification 120 to notify the BSS orchestrator 106 of the activation 116. During notification 120, the activation module 210 may send the registration information 118 to the BSS orchestrator 106.

The registration module 212 may enable and disable APNs associated with lines of telecommunication services for the BSS orchestrator 106. For an enablement requested by the BSS orchestrator 106, the registration module 212 may receive an eSIM-associated identifier and enable an APN associated with a line of telecommunication service for the eSIM-associated identifier. For a disablement by the BSS orchestrator, the registration module 212 may receive an eSIM-associated identifier and disable an APN associated with a line of telecommunication service for the eSIM-associated identifier. The billing module 214 may perform billing services using eSIM-associated identifiers. For example, the billing module 214 may bill the automaker 110 for the lines of telecommunication services provided to a fleet of vehicles using the eSIM-associated identifiers of the infotainment devices in the fleet of vehicles. In some instances, the billing of the automaker 110 may be performed at a wholesale rate for the lines of telecommunication services.

The consumer BSS 104 may include an interface module 216, a registration module 218, and a billing module 220. The interface module 216 may receive activation or cancellation requests from user devices or via a service interface portal, in which each of the requests may include a key. In response to an activation request, the registration module 218 may retrieve an available virtual identifier from the virtual identifier pool 134 and activate a line of telecommunication service for a corresponding subscription account. The registration module 218 may then notify a database logic of the virtual identifier pool 134 to change an identifier status of the virtual identifier to in use, so that the virtual identifier is no longer available for use by other consumer BSSs. The registration module 218 may further associate the key with the virtual identifier used for the new line of telecommunication service. Subsequently, the registration module 218 may send a registration request that includes the key to the BSS orchestrator 106 to notify the BSS orchestrator 106 that the subscription account has been updated to include the new line of telecommunication service.

In response to a cancellation request, the registration module 218 may deactivate the use of the virtual identifier that is associated with the key, in which deactivation of the virtual identifier terminates the billing of a subscription account for the new line of telecommunication service. In some instances, the registration module 218 may further notify the database logic of the virtual identifier pool 134 to change the identifier status of the virtual identifier to available, so that the virtual identifier is available for use by other consumer BSSs. Subsequently, the registration module 218 may send a deregistration request that includes the key to the BSS orchestrator 106 to request a disablement of the new line of telecommunication service.

The billing module 220 may use a virtual identifier provided by the registration module 218 to bill a subscription account of a consumer for a new line of telecommunication service. In various instances, the new line of telecommunication service may be an additional line that is added to a newly established subscription account of the consumer. In other instances, the new line of telecommunication service may be an additional line that is added to an existing subscription account of the consumer.

The BSS orchestrator 106 may include an interface module 222 and a request module 224. The interface module 222 may receive the registration information 118 from the wholesale BSS 102. In turn, the BSS orchestrator 106 may store the registration information 118 in an orchestration database 122. The BSS orchestrator 106 may further designate the VIN or EID in each data entry of the registration information 118 as the key of each corresponding vehicle.

The request module 224 may receive registration and deregistration requests that include corresponding keys from the consumer BSS 104. For example, the consumer BSS 104 may send the requests by calling an event application program interface (AP) of the request module 224. In some embodiments, each of the requests may further include a corresponding virtual identifier associated with a key, and/or other information. For a registration request, the request module 224 may use the orchestrator database 122 to lookup an eSIM-associated identifier that corresponds to a key. Subsequently, the request module 224 may send the eSIM-associated identifier to the wholesale BSS to request that the wholesale BSS 102 enable an APN of the new line of telecommunication service for an infotainment device identified by the eSIM-associated identifier. For a deregistration request, the request module 224 may use the orchestrator database 122 to lookup an eSIM-associated identifier that corresponds to a key. Subsequently, the request module 224 may send the eSIM-associated identifier to the wholesale BSS to request that the wholesale BSS 102 disable an APN of the new line of telecommunication service for an infotainment device identified by the eSIM-associated identifier.

Example Processes

Figure 3:
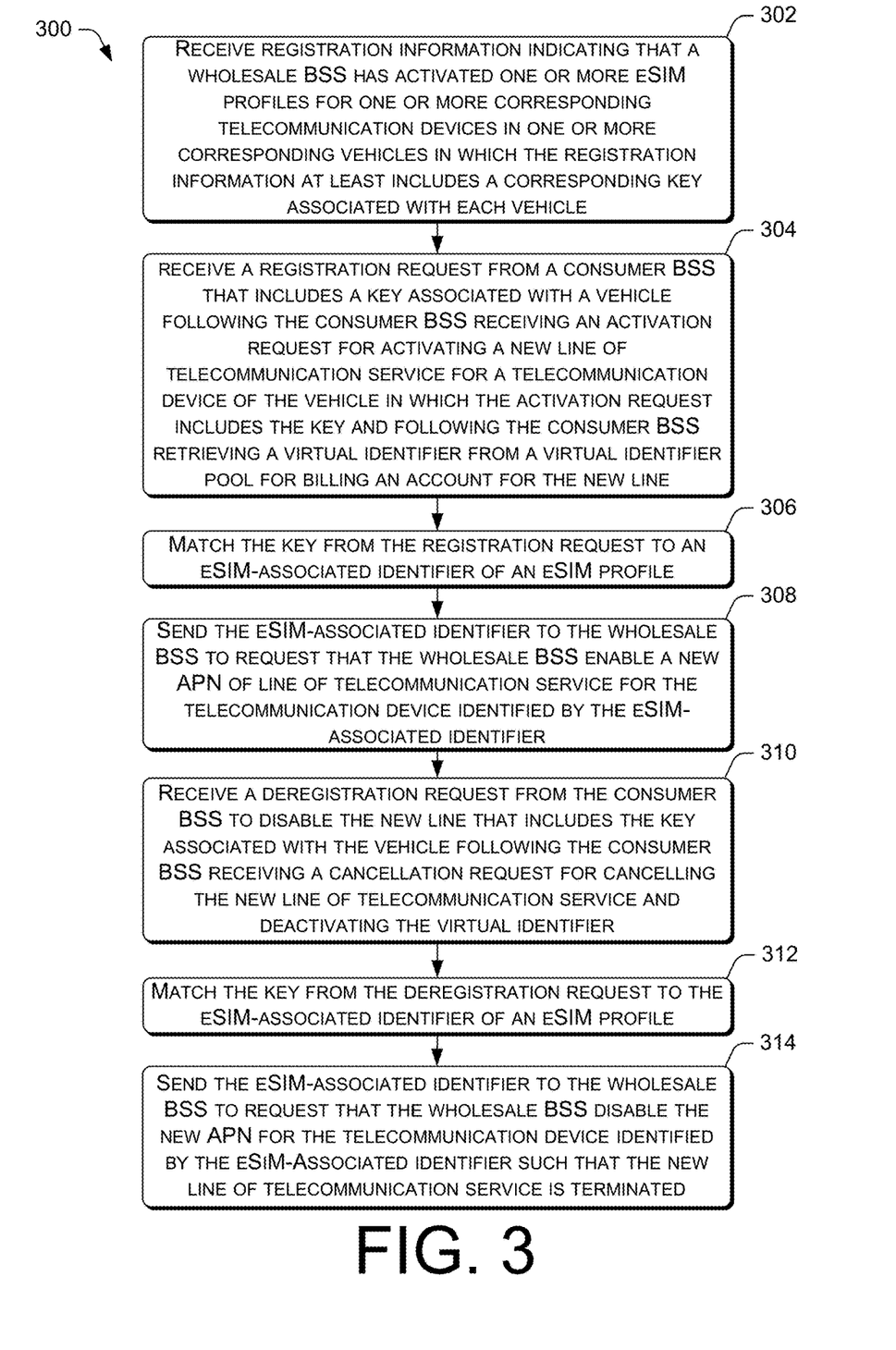
FIG. 3 is a flow diagram of an example process for a BSS orchestrator platform to support multiple BSSs that manage a single eSIM profile for billing multiple lines of telecommunication services using the eSIM profile.
Figure 4:
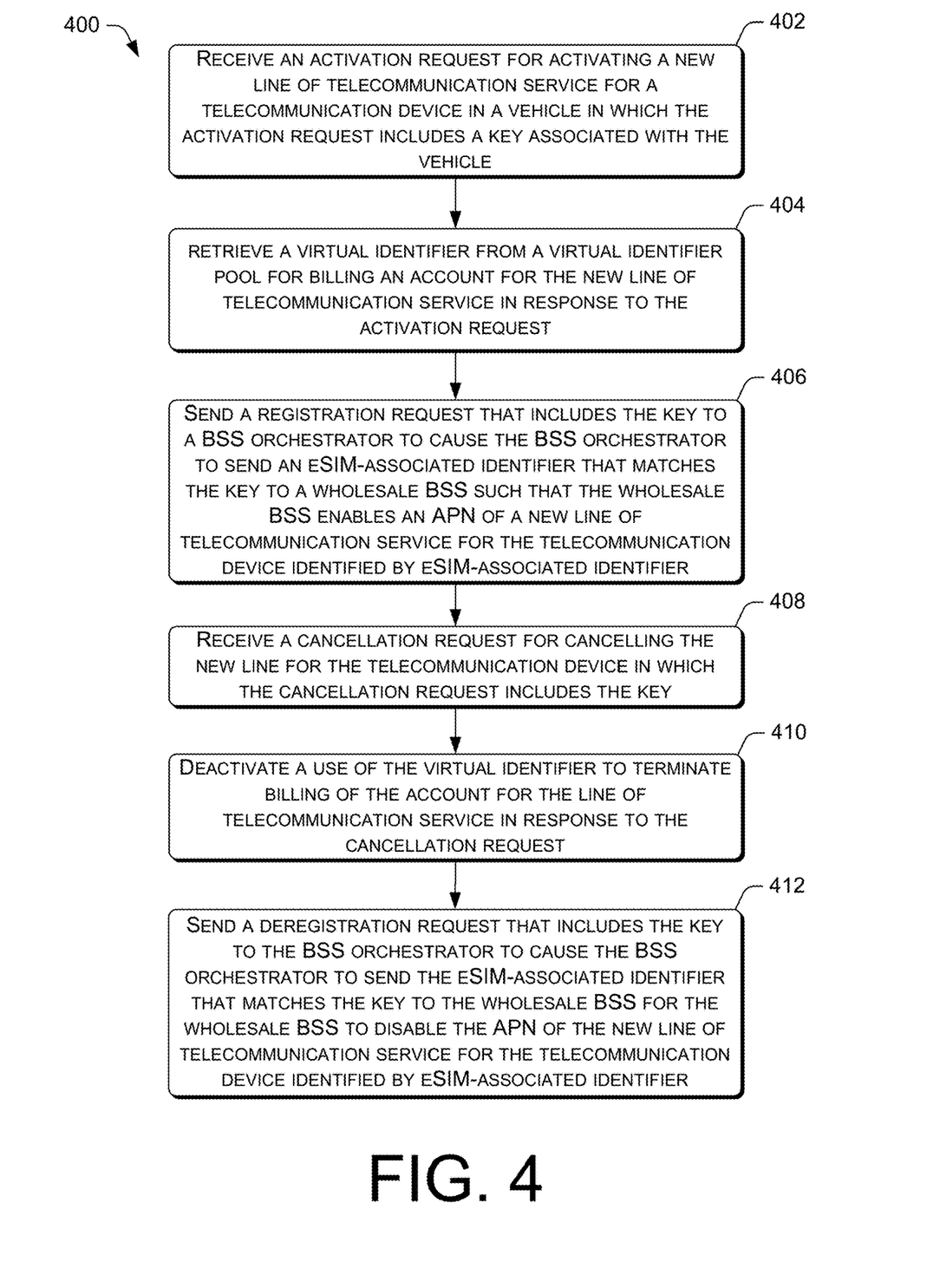
FIG. 4 is a flow diagram of an example process for a consumer BSS to coordinate with a wholesale BSS to manage a single eSIM profile for billing multiple lines of telecommunication services using the eSIM profile.

FIGS. 3 and 4 present illustrative processes 300 and 400 for enabling multiple BSSs to manage a single eSIM profile for billing multiple lines of telecommunication services using the eSIM profile. Each of the processes 300 and 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 and 400 are described with reference to the architecture 100 of FIG. 1.

FIG. 3 is a flow diagram of an example process 300 for a BSS orchestrator platform to support multiple BSSs that manage a single eSIM profile for billing multiple lines of telecommunication services using the eSIM profile. At block 302, the BSS orchestrator 106 may receive registration information indicating that the wholesale BSS 102 has activated one or more eSIM profiles for one or more corresponding telecommunication devices (e.g., infotainment devices) in one or more corresponding vehicles in which the registration information at least includes a corresponding key associated with each vehicle. For example, the key associated with a vehicle may be a VIN of the vehicle or an EID. The activation of each eSIM profile for each telecommunication device by the wholesale BSS 102 may involve enabling a wholesale APN for an eSIM-associated identifier (e.g., an IMSI or an ICCID) of each eSIM profile. In this way, each telecommunication device may access a corresponding line of telecommunication service using the wholesale APN, and the wholesale BSS 102 may use the eSIM-associated identifiers of the eSIM profiles to bill a wholesale subscription account of the automaker 110 for the lines of telecommunication services at a wholesale rate. The registration information is then sent by the wholesale BSS 102 to the BSS orchestrator 106 such that the registration information is stored in the orchestration database 122.

At block 304, the BSS orchestrator 106 may receive a registration request from the consumer BSS 104 that includes a key associated with a vehicle. The BSS orchestrator 106 may receive the registration request following the consumer BSS 104 receiving an activation request for activating a new line of telecommunication service for a telecommunication device of the vehicle in which the activation request includes the key, and following the consumer BSS 104 retrieving a virtual identifier from a virtual identifier pool for billing an account for the new line.

At block 306, the BSS orchestrator 106 may match the key from the registration request to an eSIM-associated identifier of the eSIM profile. In various embodiments, the BSS orchestrator 106 may use the registration information stored in the orchestration database 122 to look up the eSIM-associated identifier that corresponds to the key.

At block 308, the BSS orchestrator 106 may send the eSIM-associated identifier to the wholesale BSS 102 to request that the wholesale BSS 102 enable a new APN of the line of telecommunication for the telecommunication device identified by the eSIM-associated identifier. Following the enablement of the new APN, the telecommunication device is able to use the line of telecommunication service and the consumer BSS 104 is able to bill the account for the line of telecommunication service.

At block 310, the BSS orchestrator 106 may receive a deregistration request from the consumer BSS 104 to disable the new line, in which the request includes the key associated with the vehicle. The BSS orchestrator 106 may receive the request following the consumer BSS 104 receiving a cancellation request for canceling the new line of telecommunication service and deactivating the virtual identifier. At block 312, the BSS orchestrator 106 may match the key from the deregistration request to the eSIM-associated identifier of the eSIM profile. In various embodiments, the BSS orchestrator 106 may use the registration information stored in the orchestration database 122 to look up the eSIM-associated identifier that corresponds to the key.

At block 314, the BSS orchestrator 106 may send the eSIM-associated identifier to the wholesale BSS 102 to request that the wholesale BSS 102 disable the new APN for the telecommunication device identified by the eSIM-associated identifier such that the new line of telecommunication service is terminated for the telecommunication device.

FIG. 4 is a flow diagram of an example process 400 for a consumer BSS to coordinate with a wholesale BSS to manage a single eSIM profile for billing multiple lines of telecommunication services using the eSIM profile. At block 402, the consumer BSS 104 may receive an activation request for activating a new line of telecommunication service for a telecommunication device (e.g., an infotainment device) in a vehicle in which the activation request includes a key associated with the vehicle. In some embodiments, the consumer 124 may use a user device 126 to send an activation request that includes the key to the consumer BSS 104. In alternative embodiments, the consumer 124 may call or text a customer service representative of the MNO with a request to use the optional service and provide the key. In turn, the customer service representative may input an activation request for the new line telecommunication service that includes the key into a service interface portal of the consumer BSS 104.

At block 404, the consumer BSS 104 may retrieve a virtual identifier from a virtual identifier pool for billing an account for the new line of telecommunication service in response to the activation request. At block 406, the consumer BSS 104 may send a registration request that includes the key to the BSS orchestrator 106 to cause the BSS orchestrator to send an eSIM-associated identifier that matches the key to the wholesale BSS 102 such that the wholesale BSS 102 enables an APN of a new line of telecommunication service for the telecommunication device identified by the eSIM-associated identifier.

At block 408, the consumer BSS 104 may receive a cancellation request for canceling the new for the telecommunication device in which the cancellation request includes the key. In some embodiments, the consumer 124 may use a user device 126 to send a cancellation request for canceling the line of telecommunication service that includes the key to the consumer BSS 104. In alternative embodiments, the consumer 124 may call or text a customer service representative of the MNO with a request to cancel the use of the optional service and provide the key. In turn, the customer service representative may input a cancellation request for canceling the new line telecommunication service that includes the key into a service interface portal of the consumer BSS 104.

At block 410, the consumer BSS 104 may deactivate a use of the virtual identifier to terminate billing of the account for the line of telecommunication service in response to the cancellation request. At block 412, the consumer BSS 104 may send a deregistration request that includes the key to the BSS orchestrator 106 to send the eSIM-associated identifier that matches the key to the wholesale BSS 102. In turn, the wholesale BSS 102 may disable the APN of the new line of telecommunication service for the telecommunication device identified by the eSIM-associated identifier.

The embodiments may provide a mobile network operator (MNO) with the ability to use multiple BSSs to manage a single eSIM profile for billing multiple lines of telecommunication services using the eSIM profile. This ability may enable the MNO to use the multiple BSSs to simultaneous billing for the multiple lines of telecommunication services provided to a telecommunication device equipped with a single radio and a single eSIM profile without undergoing a massive BSS migration or a fundamental change in the device management infrastructure of a wireless carrier network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing node of a business support system (BSS) orchestrator in a wireless carrier network, comprising:
one or more processors; and
memory including a plurality of computer-executable components that are executable by the one or more processors to perform a plurality of actions, the plurality of actions comprising:
receiving registration information indicating that a wholesale BSS has activated one or more eSIM profiles for corresponding telecommunication devices in one or more corresponding vehicles, the registration information at least including a corresponding key associated with each vehicle;
receiving a registration request from a consumer BSS that includes a key associated with a vehicle of the one or more corresponding vehicles following: (1) the consumer BSS receiving an activation request for activating a new line of telecommunication service of the wireless carrier network for a telecommunication device of the vehicle, in which the activation request includes the key associated with the vehicle (2) the consumer BSS assigning a virtual identifier from a virtual identifier pool to the telecommunication device in response to the activation request;
matching the key from the registration request to an eSIM-associated identifier of an eSIM profile; and
sending the eSIM-associated identifier to the wholesale BSS to request that the wholesale BSS enable a new access point name (APN) of the new line of telecommunication service for the telecommunication device identified by the eSIM-associated identifier,
wherein the consumer BSS and the wholesale BSS support management of a plurality of telecommunication devices for different types of customers.

2. The computing node of claim 1, wherein an activation of an eSIM profile for a corresponding telecommunication device includes storing a correlation between the key of the vehicle and the eSIM-associated identifier of the eSIM profile in a data entry of a correlation table, and wherein the matching includes using the correlation table to match the key to the eSIM-associated identifier.

3. The computing node of claim 1, wherein the key is a vehicle identification number (VIN) of the vehicle or an embedded universal integrated circuit card identifier (EID) of an embedded universal integrated circuit card (eUICC) that stores the eSIM profile.

4. The computing node of claim 1, wherein an activation of an eSIM profile for a corresponding telecommunication device by the wholesale BSS provides the telecommunication device with access to an initial line of telecommunication service of the wireless carrier network.

5. The computing node of claim 4, wherein the initial line of telecommunication service is used for telematic services for the vehicle and the new line telecommunication service is used for infotainment services.

6. The computing node of claim 5, wherein the wholesale BSS uses the eSIM-associated identifier to bill a first account of an automaker for the initial line of telecommunication service, and the consumer BSS uses the virtual identifier to bill a second account of a consumer for the new line of telecommunication service.

7. The computing node of claim 4, wherein the activation of the eSIM profile for the telecommunication device by the wholesale BSS includes the wholesale BSS enabling an initial APN of the initial line of telecommunication service for the telecommunication device identified by the eSIM-associated identifier.

8. The computing node of claim 1, wherein the eSIM-associated identifier is an international mobile subscriber identity (IMSI) associated with the eSIM profile or an integrated circuit card identifier (ICCID) of the eSIM profile, and wherein the virtual identifier is a virtual IMSI or a virtual ICCID.

9. The computing node of claim 1, wherein the actions further comprise:
    receiving a deregistration request from a consumer BSS to disable the new line of telecommunication service that includes a key associated with the vehicle following the consumer BSS receiving a cancellation request for canceling the new line of telecommunication service and deactivating the virtual identifier in response to the cancellation request;
    matching the key from the deregistration request to the eSIM-associated identifier of the eSIM profile; and
    sending the eSIM-associated identifier to the wholesale BSS to request that the wholesale BSS disable the new APN for the telecommunication device identified by the eSIM-associated identifier such that the new line of telecommunication service is terminated for the telecommunication device.

10. The computing node of claim 9, wherein a deactivation of the virtual identifier terminates a billing of an account for the new line of telecommunication service.

11. The computing node of claim 9, wherein the virtual identifier is returned to the virtual identifier pool for another use by the consumer BSS following deactivation.

12. One or more non-transitory computer-readable media of a consumer business support system (BSS) storing computer-executable instructions that upon execution cause one or more processors of the consumer BSS to perform acts comprising:
    receiving an activation request for activating a new line of telecommunication service for a telecommunication device of a vehicle, the activation request including a key associated with the vehicle;
    assigning a virtual identifier from a virtual identifier pool to the telecommunication device to billing an account for the new line of telecommunication service in response to the activation request; and
    sending a registration request that includes the key associated with the vehicle as received by the consumer BSS to a BSS orchestrator to cause the BSS orchestrator to send an eSIM-associated identifier that matches the key to a wholesale BSS such that the wholesale BSS enables an access point name (APN) of the new line of telecommunication service for the telecommunication device identified by the eSIM-associated identifier,
    wherein the consumer BSS and the wholesale BSS support management of a plurality of telecommunication devices for different types of customers.

13. The one or more non-transitory computer-readable media of claim 12, wherein the eSIM profile is previously activated by the wholesale BSS for the telecommunication device to access an initial line of telecommunication service.

14. The one or more non-transitory computer-readable media of claim 13, wherein an activation of the eSIM profile for the telecommunication device includes enabling an initial APN of the initial line of telecommunication service for the telecommunication device identified by the eSIM-associated identifier.

15. The one or more non-transitory computer-readable media of claim 13, wherein the new line of telecommunication service is used for infotainment services and the initial line telecommunication service is used for telematic services for the vehicle.

16. The one or more non-transitory computer-readable media of claim 13, wherein the wholesale BSS uses the eSIM-associated identifier to bill an additional account for the initial line of telecommunication service.

17. The one or more non-transitory computer-readable media of claim 13, wherein an activation of the eSIM profile includes storing a correlation between the key of the vehicle and the eSIM-associated identifier of the eSIM profile in a data entry of a correlation table, and wherein the BSS orchestrator uses the correlation table to match the eSIM-associated identifier to the key.

18. The one or more non-transitory computer-readable media of claim 12, wherein the acts comprise:
    receiving a cancellation request for canceling the new line of telecommunication service in which the cancellation request includes a common key;
    in response to the cancellation request, deactivating a use of the virtual identifier to terminate billing of the account for the new line of telecommunication service; and
    sending a deregistration request that includes the key to the BSS orchestrator to cause the BSS orchestrator to send the eSIM-associated identifier that matches the key to the wholesale BSS for the wholesale BSS to disable the APN of the new line of telecommunication service for the telecommunication device identified by the eSIM-associated identifier.

19. The one or more non-transitory computer-readable media of claim 12, wherein the key is a vehicle identification number (VIN) of the vehicle or an embedded universal integrated circuit card identifier (EID) of an embedded universal integrated circuit card (eUICC) that stores the eSIM profile, and wherein the eSIM-associated identifier is an international mobile subscriber identity (IMSI) associated with the eSIM profile or an integrated circuit card identifier (ICCID) of the eSIM profile, and wherein the virtual identifier is a virtual IMSI or a virtual ICCID.

20. A computer-implemented method, comprising:
    receiving, at one or more computing nodes of a business support system (BSS) orchestrator, registration information indicating that a wholesale BSS has activated one or more eSIM profiles for corresponding telecommunication devices in one or more corresponding vehicles of an automaker, the registration information at least including a corresponding key associated with each vehicle;
    receiving, at the one or more computing nodes, a registration request from a consumer BSS that includes a key associated with a vehicle following: (1) the consumer BSS receiving an activation request for activating a new line of telecommunication service of a wireless carrier network for a telecommunication device of the vehicle in which the activation request includes the key associated with the vehicle and (2) the consumer BSS assigning a virtual identifier from a virtual identifier pool to the telecommunication device in response to the activation request;

matching, at the one or more computing nodes, the key from the registration request to an eSIM-associated identifier of an eSIM profile; and sending, at the one or more computing nodes, the eSIM-associated identifier to the wholesale BSS to request that the wholesale BSS enable a new access point name (APN) of the new line of telecommunication service for the telecommunication device identified by the eSIM-associated identifier, wherein the consumer BSS and the wholesale BSS support management of a plurality of telecommunication devices for different types of customers.

* * * * *